United States Patent
Sundaresan et al.

(10) Patent No.: US 8,880,513 B2
(45) Date of Patent: Nov. 4, 2014

(54) PRESENTATION OF ITEMS BASED ON A THEME

(75) Inventors: Neelakantan Sundaresan, Mountain View, CA (US); Karin Mauge', Mountain View, CA (US)

(73) Assignee: eBay Inc., San Jose, CA (US)

( * ) Notice: Subject to any disclaimer, the term of this patent is extended or adjusted under 35 U.S.C. 154(b) by 322 days.

(21) Appl. No.: 13/094,582

(22) Filed: Apr. 26, 2011

(65) Prior Publication Data
US 2012/0278314 A1     Nov. 1, 2012

(51) Int. Cl.
   *G06F 17/30* (2006.01)
(52) U.S. Cl.
   CPC .................................. *G06F 17/3064* (2013.01)
   USPC ....................................................... 707/723
(58) Field of Classification Search
   USPC ....................................... 705/14.52; 707/723
   See application file for complete search history.

(56) References Cited

U.S. PATENT DOCUMENTS

| | | |
|---|---|---|
| 7,979,321 B2 | 7/2011 | Mohan |
| 2009/0150214 A1 | 6/2009 | Mohan |
| 2009/0259620 A1 | 10/2009 | Ahene et al. |

OTHER PUBLICATIONS

"Fashion Trends and News on Style", Style.com © 2010 Condé NastDigital, [Online]. Retrieved from the Internet: <http://www.style.com/trendsshopping/>, (Accessed Feb. 10, 2011), 2 pgs.

"Pop-Up Retail", [Online]. Retrieve from the Internet: <http://trendwatching.com/trends/POPUP_RETAIL.htm>, (Jan. 2004), 18 pgs.

*Primary Examiner* — Huawen Peng
(74) *Attorney, Agent, or Firm* — Schwegman Lundberg & Woessner, P.A.

(57) ABSTRACT

Queries submitted by users when interacting with a network-based system may be analyzed by a query mining machine that determines a theme common to the submitted queries. The machine accesses the submitted queries and identifies a portion of the submitted queries as corresponding to the theme. Identification of the portion may include determining a strength score of a submitted query, where the strength score indicates a degree of influence that the submitted query is to have on the identifying of the portion. The machine generates a thematic query based on the identified portion and obtains search results by executing the thematic query. The search results correspond to a group of items. The machine presents at least some of the group of items as a collection that corresponds to the theme (e.g., within a temporary electronic storefront).

21 Claims, 9 Drawing Sheets

PRESENTATION OF ITEMS BASED ON A THEME

TECHNICAL FIELD

The subject matter disclosed herein generally relates to the processing of data. Specifically, the present disclosure addresses systems and methods to facilitate presentation of items based on a theme.

BACKGROUND

A product may be manufactured by a manufacturer and available for purchase from a seller. For example, the product may take the form of a good (e.g., a physical object), a service (e.g., performed by a service provider), information (e.g., digital media), a license (e.g., authorization to access something), or any suitable combination thereof. An item may be a specimen (e.g., an individual instance) of the product, and multiple items may constitute multiple specimens of the product. Accordingly, a seller of a product may seek to merchandise one or more items as specimens of the product.

In merchandising an item, the seller may use a network-based system to present the item to a user of the network-based system (e.g., a potential buyer of the item). Examples of network-based systems include commerce systems (e.g., shopping websites), publication systems (e.g., classified advertisement websites), listing systems (e.g., auction websites), and transaction systems (e.g., payment websites). The item may be presented within a document (e.g., a webpage) that describes the item or product. In shopping for an item, one or more users may search the network-based system (e.g., by submitting queries) for such documents or similar information regarding details of the item or product.

BRIEF DESCRIPTION OF THE DRAWINGS

Some embodiments are illustrated by way of example and not limitation in the figures of the accompanying drawings.

DETAILED DESCRIPTION

Figure 1:
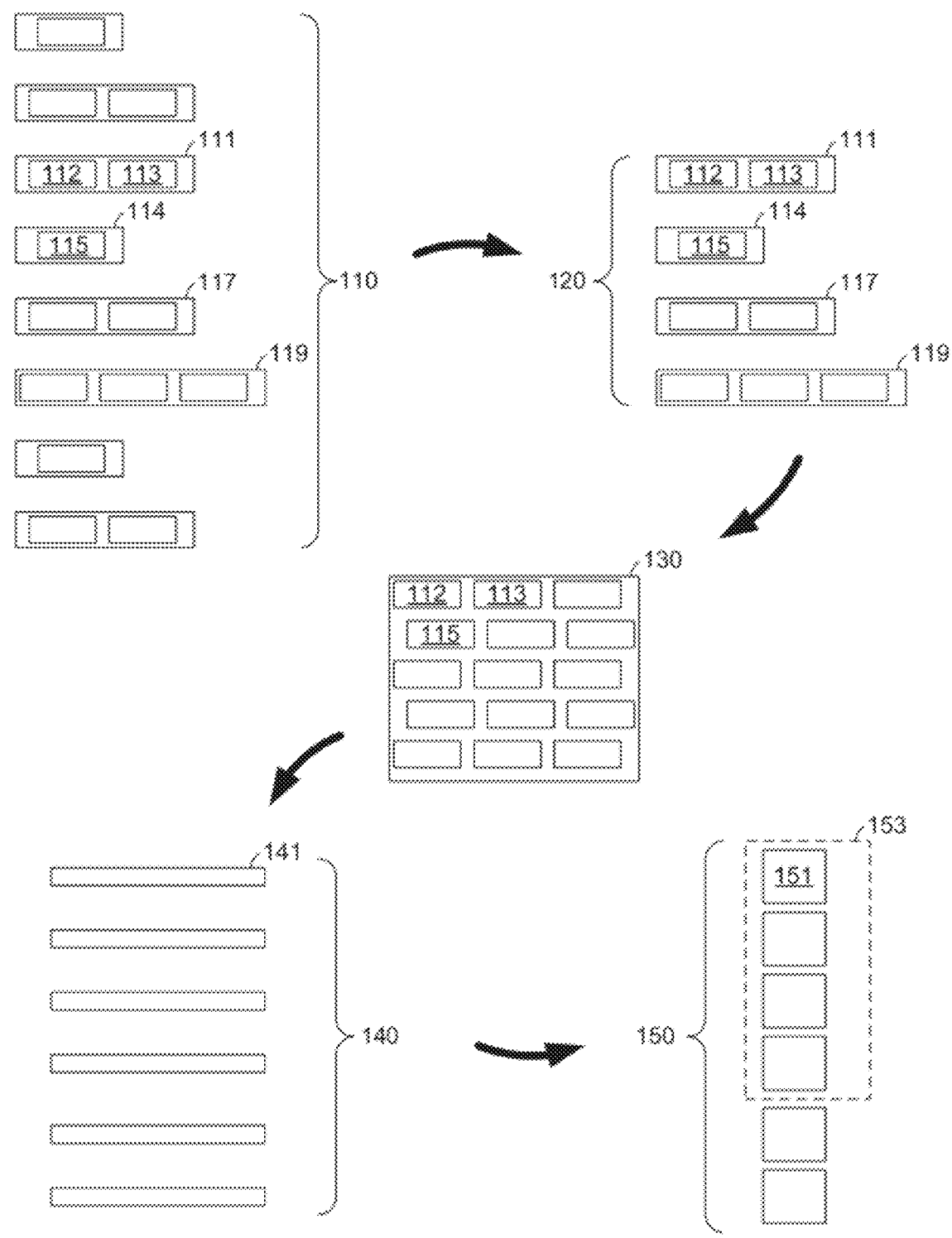
FIG. 1 is a conceptual diagram illustrating presentation of items based on a theme, according to some example embodiments.

Example methods and systems are directed to presentation of items based on a theme. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Queries submitted by users interacting with a network-based system may be analyzed by a machine (e.g., a query mining machine) that determines a theme common to the submitted queries. The machine may aggregate the submitted queries and store them in a query database for such analysis. The analysis accesses the submitted queries and identifies a portion of the submitted queries as corresponding to the theme. Identification of the portion includes determining a strength score of a submitted query (e.g., each of the submitted queries), where the strength score indicates a degree of influence that the submitted query is to have on the identifying of the portion. The machine identifies a portion based on the strength score of the submitted query and may analyze each of the submitted queries in this matter.

To identify items for presentation, the machine generates a thematic query (e.g., a new query separate from the aggregated query submitted by users) and obtains search results by executing the thematic query. Since the search results are obtained based on the thematic query, the search results each correspond to the theme. Moreover, each of the search results corresponds (e.g., by a reference) to one of a group of items that likewise correspond to the theme. The search results may be obtained from the same network-based system previously searched by the users. Some of the group of items may constitute a collection (e.g., a single collection) of items that correspond to the theme. Accordingly, the machine may present some of the group of items (e.g., to a user of the network-based system) as a collection that corresponds to the theme.

As used herein, a "theme" is a descriptor of a concept that is applicable to queries, search results, products, items, or any suitable combination thereof. A theme may be represented by, and may include, one or more descriptive tokens (e.g., words, letters, numbers, or symbols). As an example, supposing that a number of users of a network-based system submit queries for "turkey," "pilgrim," "cranberry sauce," and "pumpkin pie," then a theme that is common to these queries may be "Thanksgiving," in reference to the American holiday by that name and which is commonly symbolized by the descriptive tokens "turkey," "pilgrim," "cranberry sauce," and "pumpkin pie." As another example, where users submit queries for "costume," "pumpkin," and "ghost," then a theme that is common to these queries may be "Halloween," referencing an American holiday symbolized by the descriptive tokens "costume," "pumpkin," and "ghost." Although the word "pumpkin" appears in the descriptive tokens for both themes, the word "ghost" is absent from the descriptive tokens for the theme "Thanksgiving," and the word "turkey" is absent from the descriptive tokens for the theme "Halloween."

Moreover, a theme need not use any of the descriptive tokens appearing in queries which have that theme in common. For example, the theme "Super Bowl" may be formed from the descriptive tokens "super" and "bowl," and may be common to queries for "football," "champions," and "NFL" submitted during the month of January. Yet none of these queries include the words "super," "bowl," or "super bowl" as search criteria within the queries themselves. Accordingly, a theme may include a descriptive token that is absent from one or more submitted queries that have that theme in common.

Examples of themes include periodic events (e.g., holidays, seasons, calendar dates, astronomical events, religious events, or government events), as well as news events (e.g., news reports, press releases, blog postings, social network postings, or publications). Additional examples of themes include sports events (e.g., "Super Bowl," "World Series," or "the Olympics"), media events (e.g., the name of a recently released movie or an upcoming concert), political events (e.g., the election or resignation of a public official), and celebrity events (e.g., a baby born to a celebrity, the death of a celebrity, or two celebrities marrying). Further examples of themes include various events, trends, fads, and memes that may appear without apparent reason in popular culture (e.g., a popular video distributed on the Internet).

FIG. 1 is a conceptual diagram illustrating presentation of items based on a theme, according to some example embodiments. As shown, submitted queries 110 are aggregated submissions of one or more search criteria from multiple users of a network-based system. The submitted queries 110 include individual queries 111, 114, 117, and 119, among others. As examples, the query 111 includes two search criteria 112 and 113, while the query 114 includes a single search criterion 115. A search criterion may include one or more descriptive tokens (e.g., "turkey" or "pumpkin pie"). Of course, a given query within the submitted queries 110 may include any number of search criteria and hence any number of descriptive tokens. Moreover, a given query may include one or more operators (e.g., "and," "or," "not," "contains," "starts with," "ends with," etc.) to define relationships among its search criteria.

As indicated in FIG. 1 by a large curved arrow, the submitted queries 110 are processed (e.g., by a query mining machine) to identify a portion 120 of the submitted queries 110. In other words, the portion 120 is a subset of the aggregated submissions from the multiple users. More specifically, the portion 120 is identified as corresponding to a theme. As noted above, a theme may include or be represented by one or more descriptive tokens. The descriptive tokens of a theme may or may not coincide with search criteria (e.g., descriptive tokens) of queries in the portion 120 of the submitted queries 110. As shown, the portion 120 includes the queries 111, 114, 117, and 119, although other queries from the submitted queries 110 are missing (e.g., excluded, ignored, or deleted) from the portion 120. Identification of the portion 120 need not alter any search criteria within the queries included in the portion 120. As shown, the search criteria 112 and 113 are still included in the query 111, and the search criterion 115 remains included in the query 114. Similarly, the queries 117 and 119 are unchanged in the identification of the portion 120.

As indicated in FIG. 1 by another large curved arrow, the portion 120 of the submitted queries 110 is processed (e.g., by the query mining machine) to generate a thematic query 130. That is, generation of the thematic query 130 is based on the portion 120, which was previously identified as corresponding to the theme. Since the thematic query 130 is generated based on the portion 120, the thematic query 130 also corresponds to the theme. As shown, the thematic query 130 includes the search criteria 112, 113, and 115, which were included in the portion 120. Moreover, the thematic query 130 may include additional search criteria present in the portion 120. Once generated, the thematic query 130 is executable to obtain search results 140.

As indicated in FIG. 1 by a further large curved arrow, the thematic query 130 is processed (e.g., executed by the query mining machine) to obtain the search results 140. For example, the thematic query 130 may be submitted as a search request to the network-based system, which returns the search results 140 in response to the thematic query 130. Since the thematic query 130 corresponds to the same theme as the portion 120 of the submitted queries 110, the search results 140 similarly correspond to the theme. As shown, the search results 140 include a search result 141, which corresponds to the theme.

As indicated in FIG. 1 by yet another large curved arrow, the search results 140 reference a group 150 of items, and the search results 140 may be processed (e.g., correlated by the query mining machine) to identify or access the group 150 of items. For example, each of the search results 140 may be a hyperlink to a document (e.g., a webpage) that describes a particular item, and each hyperlink may be followed to access (e.g., read or retrieve) each item's document. Since the search results 140 correspond to the same theme as the portion 120 of the submitted queries 110, the group 150 of items also corresponds to this same theme. As shown, the group 150 includes an item 151, which likewise corresponds to the theme, as well as additional items. Moreover, a collection 153 of items is a subset (e.g., a portion) of the group 150 of items and includes the item 151, among others. The collection 153, being a part of the group 150, also corresponds to the theme. Accordingly, presentation of the collection 153 of items may be performed (e.g., by a query mining machine) to present at least some of the group 150 of items based on the theme. The collection 153 of items therefore may be presented to a user (e.g., of a query mining machine) as being pertinent to the theme, where the theme may be a currently trending topic mined from the submitted queries 110.

Figure 2:
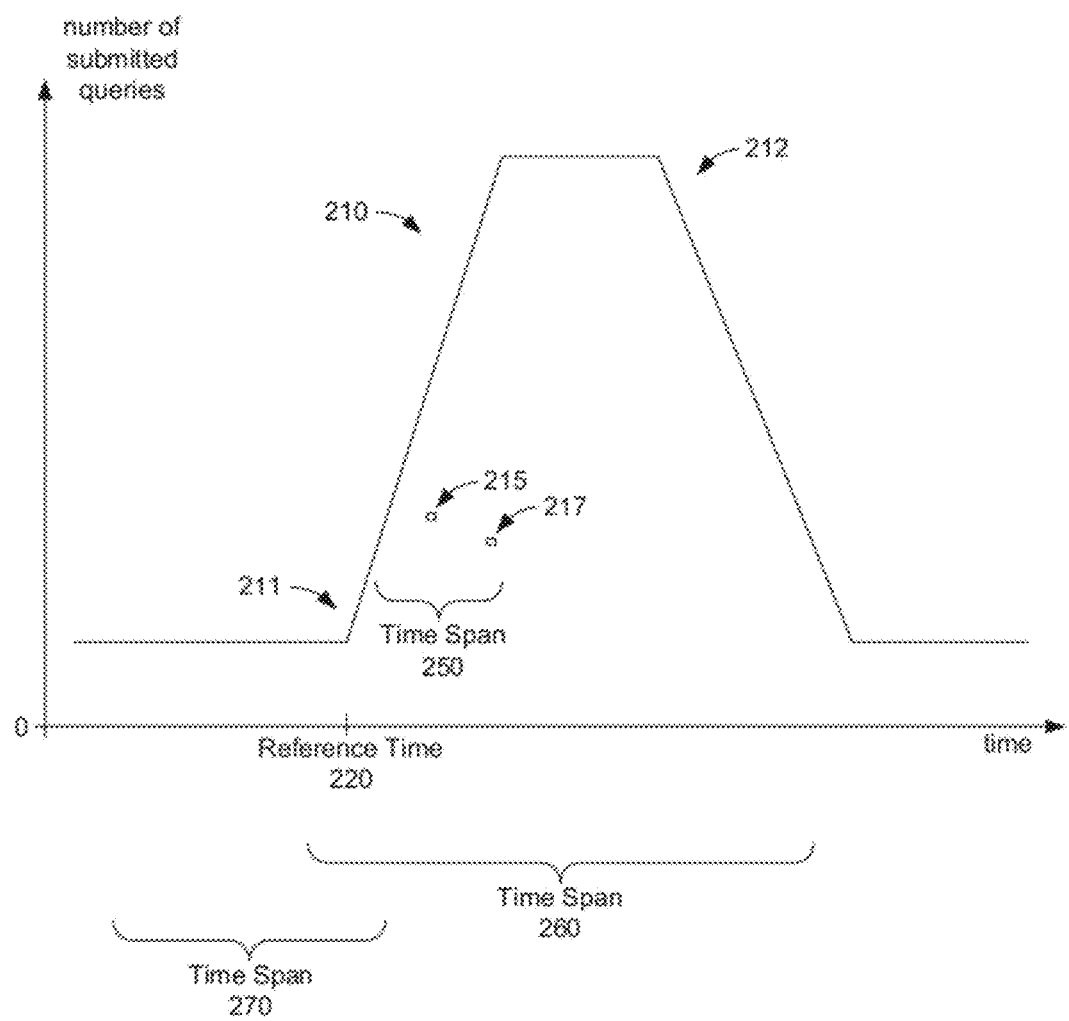
FIG. 2 is a line graph of submitted queries over time, which illustrates a theme for presentation of items, according to some example embodiments.

FIG. 2 is a line graph of submitted queries over time, illustrating a theme for presentation of items, according to some example embodiments. In particular, FIG. 2 shows a vertical axis representing a number of submitted queries (e.g., submitted queries 110) aggregated from multiple users of a network-based system. FIG. 2 also shows a horizontal axis that represents the passage of time. As shown, a line 210 represents the number of submitted queries that are submitted by users at various points in time (e.g., on a particular day) using search criteria (e.g., search criteria 112, 113, and 115) that correspond to a particular theme.

Within FIG. 2, the line 210 indicates that the number of submitted queries corresponding to the theme is approximately constant until a reference time 220. The reference time 220 marks a point in time with any degree of precision (e.g., a year, a season, a week, a date, an hour, or a minute). At the reference time 220, an increase 211 begins in the rate of query submission for the theme. At a later time, the rate of query submission levels off, and at an even later time, a decrease 212 begins in the rate of query submission for this theme. Finally, the rate of query submission levels off again at a relatively constant query submission rate, which may be considered normal for the corresponding theme. Of course, various users of the network-based system may be submitting different queries that are unrelated to the theme at any point during this time.

The line 210, with the increase 211 and decrease 212 in the rate of query submission, represent a rise and fall in interest in the theme. In other words, the theme may experience a surge or spike in interest, as evidenced by the submission of queries to the network-based system by some or all of its users.

As shown in FIG. 2, queries 215 and 217 are individual queries that are submitted within a time span 250. In addition, time span 260 is shown as including the reference time 220, and at least some of the time span 260 is subsequent to the reference time 220. Also, time span 270 is shown as including the reference time 220, and at least some of the time span 270 is precedent to the reference time 220.

As discussed above with respect to FIG. 1, a query mining machine may identify the portion 120 of the submitted queries 110 as corresponding to a theme. The identification of the portion 120 may be based on the number of the submitted queries 110 that are submitted within the time span 250, the time span 260, the time span 270, or any suitable combination thereof. For example, the query mining machine may detect the increase 211 in query submissions for "Michael Jackson, singer" based on the queries 215 and 217 being submitted within the time span 250 and including the descriptive tokens "Michael," "Jackson," and "singer."

In other words, the query mining machine may detect an accelerating rate of query submissions that use those descriptive tokens by measuring times (e.g., time span 250) between submissions of such queries (e.g., based on the time span 250 being less than an average time span for submission of queries that correspond to the theme). Similarly, the query mining machine may detect a decelerating rate of query submissions (e.g., starting with the decrease 212 in query submissions) by measuring times (e.g., time span 250) between submissions of such queries (e.g., based on the time span 250 being greater than an average time span for submission of queries that correspond to the theme).

As another example, supposing that the reference time 220 marks a periodic holiday (e.g., Christmas, which corresponds to an increase in shopping for gifts), the identification of the portion 120 may be based on the time span 270, which may represent a shopping season associated with the periodic holiday (e.g., a gift buying period). As yet another example, supposing that the reference time 220 marks a news event (e.g., a tragic hurricane that destroys many homes), the identification of the portion 120 may be based on the time span 260, which may represent a period of need or interest in purchasing relevant items (e.g., construction supplies). Accordingly, a query mining machine may identify the portion 120 of the submitted queries 110 with or without use of the reference time 220, depending on the example embodiment being implemented.

Figure 3:
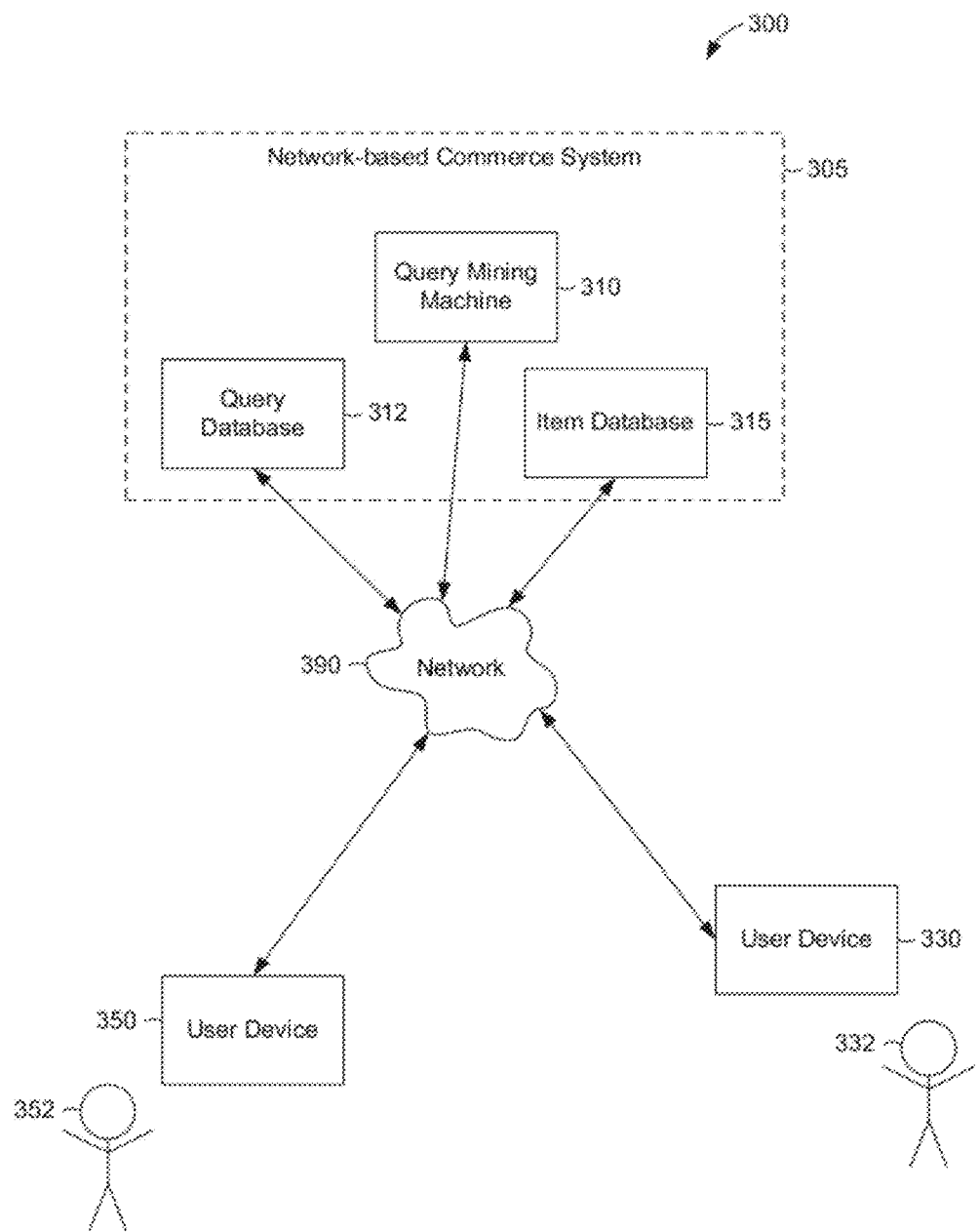
FIG. 3 is a network diagram illustrating a network environment suitable for presentation of items based on a theme, according some example embodiments.

FIG. 3 is a network diagram illustrating a network environment 300 suitable for presentation of items based on a theme, according to some example embodiments. The network environment 300 includes a query mining machine 310, a query database 312, an item database 315, and user devices 330 and 350, all communicatively coupled to each other via a network 390. As shown, the query mining machine 310, the query database 312, and the item database 315 may form all or part of a network-based commerce system 305 (e.g., an online electronic storefront). The query mining machine 310 may be implemented in a computer system, as described below with respect to FIG. 8.

The query database 312 is a data repository that stores queries (e.g., the submitted queries 110). The queries may be submitted by users of the network-based commerce system 305 and may be aggregated by the query mining machine 310 over time.

The item database 315 is a data repository that stores information regarding items (e.g., group 150 of items). The information regarding the items may take the form of database records a record for each item), documents (e.g., a webpage for each item), listings (e.g., a classified ad or an auction listing for each item), or any suitable combination thereof.

Also shown in FIG. 3 are users 332 and 352. One or both of the users 332 and 352 may be a human user (e.g., a human being), a machine user (e.g., software program configured to interact with the user device 330), or any suitable combination thereof (e.g., a human assisted by a machine). The user 332 is not part of the network environment 300, but is associated with the user device 330 and may be a user of the user device 330. For example, the user device 330 may be a deskside computer, a tablet computer, or a smart phone belonging to the user 332. Similarly, the user 352 is not part of the network environment 300, but is associated with the user device 350. As an example, the user device 350 may be a tablet computer belonging to the user 352.

Any of the machines, databases, or devices shown in FIG. 3 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 8. As used herein, a "database" is a data storage resource and may store data structured as a text file, a table, a spreadsheet, a relational database, a triple store, or any suitable combination thereof. Moreover, any two or more of the machines illustrated in FIG. 3 may be combined into a single machine, and the functions described herein for any single machine may be subdivided among multiple machines.

The network 390 may be any network that enables communication between machines (e.g., query mining machine 310 and the user device 330). Accordingly, the network 390 may be a wired network, a wireless network, or any suitable combination thereof. The network 390 may include one or more portions that constitute a private network, a public network (e.g., the Internet), or any suitable combination thereof.

Figure 4:
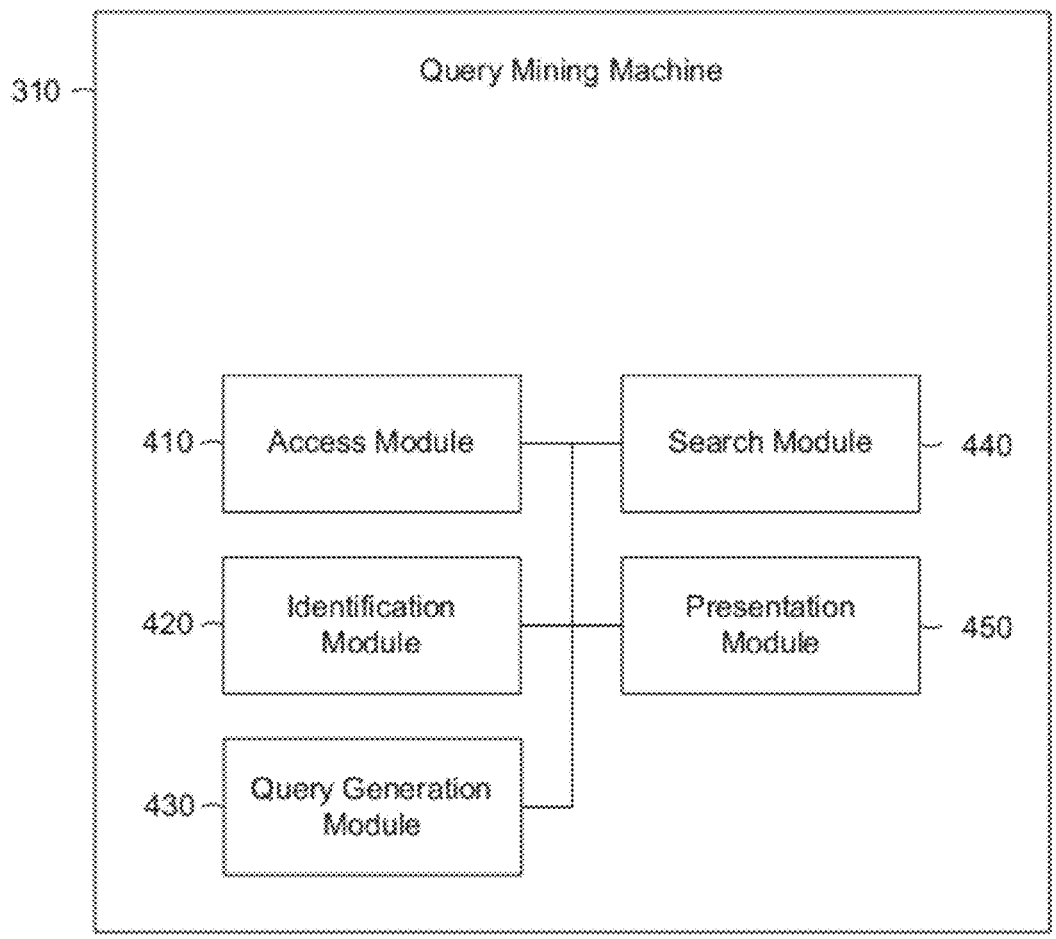
FIG. 4 is a block diagram illustrating components of a query mining machine, according to some example embodiments.

FIG. 4 is a block diagram illustrating components of the query mining machine 310, according to some example embodiments. The query mining machine 310 includes an access module 410, an identification module 420, a query generation module 430, a search module 440, and a presentation module 450, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The access module 410 is configured to access the submitted queries 110. The submitted queries 110 may be aggregated by the query mining machine 310 from multiple users of the network-based commerce system 305 and stored in the query database 312. Accordingly, the access module 410 may access the submitted queries 110 by accessing the query database 312.

In some example embodiments, the access module 410 aggregates the submitted queries 110 (e.g., by monitoring queries submitted to the network-based commerce system 305). The access module 410 may also record metadata corresponding to each of the submitted queries 110. Examples of such metadata for a particular query include a time of submission (e.g., reference time 220) for the query, a username of a user that submitted the query, an activity level of the user that submitted the query, a browser session used to submit the query, a count (e.g., a number) of search criteria included in the query, or any suitable combination thereof. As noted above, a query may include one or more search criteria (e.g., search criteria 112 and 113).

The identification module 420 is configured to identify the portion 120 of the submitted queries 110 by identifying which of the submitted queries 110 correspond to a theme (e.g., identify a subset of the submitted queries 110 that corresponds to "Thanksgiving," "Halloween," or "Michael Jackson, singer"). This identification of the portion 120 includes determining a strength score of a submitted query (e.g., query 111) among the submitted queries 110. In particular, a strength score may be determined for each of the submitted queries 110, and these strength scores may be used to determine which of the submitted queries 110 are more likely to be pertinent to a theme. For example, a subset of the submitted queries 110 that has high strength scores may be analyzed by the identification module 422 extract one or more themes from the search criteria (e.g., search criteria 112 and 113) contained in the subset of the submitted queries 110. Accordingly, a particular strength score indicates a degree of influence that a particular submitted query has on the identifying of the portion 120. In some example embodiments, the greater the strength score, the greater the degree of influence. An alternative example embodiments, the lower the strength score, the greater the degree of influence. For example, the strength score may be a numerical score with a value between zero and one, where a value of zero indicates no influence and a value of one indicates maximum influence. As another example, the strength score may take a value between one and 100, with lower numerical value (e.g., 11) indicating greater influence on the identification of the portion 120 (e.g., compared to 91).

The query generation module 430 is configured to generate the thematic query 130 based on the portion 120 of the submitted queries 110. As noted above, the thematic query 130 corresponds to the theme (e.g., corresponds to "Thanksgiving," "Halloween," or "Michael Jackson, singer"). The query generation module 430 may provide the thematic query 130 to the search module 440 for use in execution of the thematic query 130.

The search module 440 is configured to execute the thematic query 130 (e.g., as provided by the query generation module 430) and obtain search results 140 from execution of the thematic query 130. In other words, the search module 440 may be configured to obtain the search results 140 by executing the thematic query 130. For example, the search module 440 may access one or more search engines to execute the thematic query 130. In some example embodiments, the search module 440 includes one or more search engines to execute the thematic query 130. As noted above, the search results 140 correspond to the theme (e.g., correspond to "Thanksgiving," "Halloween," or "Michael Jackson, singer").

Execution of the thematic query 130 may be performed using the item database 315 (e.g., accessing, indexing, or searching the item database 315) to obtain the search results 140 from the item database 315. According to some example embodiments, the search results 140 include information retrieved from the item database 315 (e.g., a database record, a document, or a listing). Hence, the search result 141 may be a database record, a document, a listing, or any suitable combination thereof for an item (e.g., item 151). In certain example embodiments, the search results 140 include references (e.g., pointers or hyperlinks) to information stored in the item database 315 (e.g., a database record, a document, or a listing). In such cases, the search result 141 may be a reference to a database record, a document, a listing, or any suitable combination thereof, for the item.

The presentation module 450 is configured to present at least some of the group 150 of items as corresponding to the theme (e.g., as corresponding to "Thanksgiving," "Halloween," or "Michael Jackson, singer"). The group 150 of items may be presented to a potential buyer of those items within an electronic storefront specifically made to showcase items that correspond to the theme. In some example embodiments, the presentation module 450 presents the collection 153 of items (e.g., item 151) as a single collection that corresponds to the theme. In certain example embodiments, the presentation module presents at least some of the group 150 of items as multiple collections that each correspond to the theme.

Figure 5:
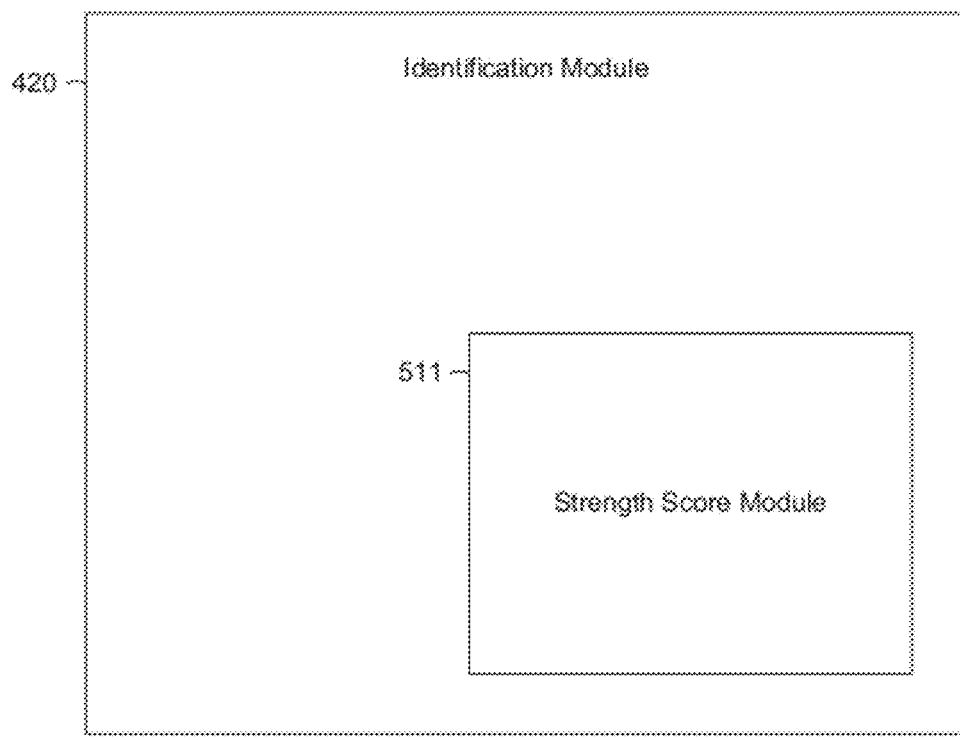
FIG. 5 is a block diagram illustrating an identification module of a query mining machine, according to some example embodiments.

FIG. 5 is a block diagram illustrating the identification module 420 of the query mining machine 310, according to some example embodiments. As shown, the identification module 420 includes a strength score module 511. The strength score module 511 is configured to analyze the submitted queries 110 and determine the strength score of one or more queries (e.g., queries 111, 114, 117, and 119) within the submitted queries 110. As noted above, the strength score of a query indicates the degree of influence that the query has on the identifying of the portion 120.

In some example embodiments, a query (e.g., query 111) includes multiple search criteria (e.g., search criteria 112 and 113). The multiple search criteria may be counted by the strength score module 511 to determine a count of search criteria (e.g., 2 search criteria). In some example embodiments, the strength score module 511 accesses the count of search criteria (e.g., from the query database 312). Accordingly, the strength score module 511 may determine the strength score of the query based on the count of search criteria. This may have the effect of assigning more influential strength scores to queries having more search criteria, which may indicate that these queries are more carefully constructed, more specific in intent, submitted by more advanced users, or any suitable combination thereof.

Similarly, a different query (e.g., query 114) may include only one search criterion (e.g., search criterion 115) and result in a count of one search criterion for the different query. Accordingly, the strength score module 511 may determine the strength score of the different query to indicate a degree of influence lower than that of a more sophisticated query (e.g., with a higher count of search criteria). In other words, the strength score module 511 may assign less influential strength scores to queries having fewer search criteria, which may indicate that these queries are less carefully constructed, less specific in intent, submitted by less advanced users, or any suitable combination thereof. According to certain example embodiments, the count of search criteria is one of multiple factors used by the strength score module 551 to determine the strength score of a particular query.

In certain example embodiments, multiple queries (e.g., queries 111 and 114) are submitted in a single browser session (e.g., the same browser session). A browser session may be indicated by browser session data that identifies a particular browser session. For example, the browser session data may be a session identifier generated by a server (e.g., a web server). The session identifier may be provided by the server to a client (e.g., user device 330) for use by a browser (e.g., a web browser) executing on the client. The session identifier may be stored temporarily or permanently on the client within the browser session data (e.g., a browser cookie). Accordingly, in communicating with the server, the client may include the session identifier (e.g., with submission of a query), thereby identifying multiple communications that are associated with the same session identifier. For example, the server may provide a newly generated session identifier to the client upon successful submission of valid login credentials (e.g., of the user 332), and a series of communications from the client to the server each may include or reference this session identifier. Accordingly, the series of communications each may be associated with the login credentials. The server may expire the session identifier, for example, after a predetermined period of time, after the login credentials are submitted from a different client (e.g., user device 350), after different login credentials are submitted from the same client, or any suitable combination thereof. A browser session, therefore, endures as long as its corresponding session identifier is valid and recognized by the server.

Where multiple queries (e.g., queries 111 and 114) are submitted in a single browser session, the strength score module 511 may determine the strength score of one or more of the multiple queries based on the fact that the multiple queries are submitted in the same browser session. This may have the effect of assigning more influential strength scores to queries from the same browser session, which may indicate that the queries are related by a common search strategy being implemented by a user (e.g., user 332). For example, the multiple queries may constitute multiple attempts to search for items pertinent to a particular theme (e.g., "Thanksgiving," "Halloween," or "Michael Jackson, singer").

Similarly, a further query e.g., query 119) may be submitted in a different browser session (e.g., as corresponding to a different session identifier) without other queries. Accordingly, the strength score module 511 may determine the strength score of the further query to indicate a degree of influence tower than strength scores determined for multiple queries submitted in a single browser session. In other words, the strength score module 511 may assign less influential strength scores to isolated queries, as determined by their corresponding browser sessions. According to certain example embodiments, the fact that multiple queries are submitted in a single browser session is one of multiple factors used by the strength score module 551 to determine the strength score of a particular query.

In various example embodiments, a query (e.g., query 111) is submitted by a particular user (e.g., user 330) that has a particular username (e.g., a login identifier), and the particular username may correspond to a particular activity level with respect to a network-based system (e.g., network-based commerce system 305). The particular activity level may be representative of a number of transactions conducted using the network-based system (e.g., a number of sales, purchases, or both), a number of queries submitted to the network-based system (e.g., queries 111 and 114), an age of the particular username (e.g., new user, novice user, casual user, experienced user, advanced user, or power user), a reputation score of the particular username (e.g., positive or negative experiences), or any suitable combination thereof.

In storing the submitted queries 110, the query database 312 may store the username of the user that submitted each of the submitted queries 110, as well as the corresponding activity level for each username. The particular activity level may be compared by the strength score module 511 to a threshold activity level, where the threshold activity level may indicate a minimum or maximum level of activity with respect to the network-based system for a particular class of users. Based on this comparison of the particular activity level with the threshold activity level, the strength score module 511 may determine that the particular activity level transgresses a threshold activity level and accordingly may determine the strength score of the query based on the particular username, its corresponding activity level, or any suitable combination thereof. For example, the strength score module 511 may assign more influential strength scores to queries submitted by more sophisticated users (e.g., experienced users, advanced users, or power users).

Likewise, a different query (e.g., query 119) may be submitted by a different user who has a different username, and the different username may correspond to a different activity level with respect to the network-based system. The different activity level may be compared by the strength score module 511 to a threshold activity level, where the threshold activity level may indicate a minimum or maximum level of activity for a different class of users. Based on this comparison of the different activity level with the threshold activity level, the strength score module 511 may determine that the different activity level transgresses the threshold activity level and accordingly may determine the strength score of the different query based on the different username, the different activity level, or any suitable combination thereof. For example, the strength score module 511 may assign less influential strength scores to queries submitted by less sophisticated users (e.g., new users, inexperienced users, or casual users). According to certain example embodiments, the activity level of a user that submitted a particular query is one of multiple factors used by the strength score module 551 to determine the strength score of that particular query.

According to some example embodiments, the strength score module 511 is configured to access the reference time 220, which may mark an event (e.g., a periodic event or a news event), as well as a time span (e.g., time span 260 or time span 270) that includes the reference time 220. A query (e.g., query 111) may be submitted within the time span. In such cases, the strength score module 511 may determine the strength score based on the query being submitted within the time span.

For example, the reference time 220 may mark a periodic event (e.g., an annual event, a monthly event, a calendar event, an astronomical event, a religious event, a government event, a holiday, or a season), and the query may be submitted within the time span 270, at least a portion of which is precedent to the reference time 220. Accordingly, the strength score may be determined by the strength score module 511 based on the query being submitted in the time span 270.

As another example, the reference time 220 may mark a news event (e.g., a press release, a blog posting, a social network posting, or a publication of a news report), and the query may be submitted within the time span 260, at least a portion of which is subsequent to the reference time 220. Hence, the strength score may be determined by the strength score module 511 based on the query being submitted in the time span 260.

According to certain example embodiments, the strength score module 511 is configured to detect a time span (e.g., time span 250) in which submitted queries (e.g., submitted queries 110) are submitted at an accelerating or decelerating rate of submission. As noted above, queries 215 and 217 are submitted within a time span 250, which is associated with the increase 211 in the rate of query submission for a particular theme e.g., "Thanksgiving," "Halloween," or "Michael Jackson, singer").

In determining the strength score of the query 215, the strength score module 511 may determine that a subset of the submitted queries 110 is submitted during the time span 250 and detect the increase 211 in the rate of query submission. For example, the strength score module 511 may determine that a time span (e.g., time span 250) between queries (e.g., queries 215 and 217) is less than an average time span for submission of queries that correspond to the theme. In some example embodiments, a threshold time span is used instead of an average time span. This may have the effect of detecting a surge or spike in query submissions for that theme, where the surge or spike includes the subset of the submitted queries 110. Accordingly, the identified portion 120 may include the subset of the submitted queries 110, based on an increase (e.g., increase 211) in query submissions. In other words, the strength score module 511 may facilitate identification of the portion 120 as corresponding to the search or spike in query submissions.

Similarly, the strength score module 511 may detect the decrease 212 in the rate of query submission for the theme. For example, the strength score module 511 may determine that a time span (e.g., time span 250) between submitted queries (e.g., queries 215 and 217) is greater than an average time span for submission of queries that correspond to the theme. In certain example embodiments, a threshold time span is used instead of an average time span. This may have the effect of detecting a drop or lull in query submissions for that theme, where the drop or lull includes the subset of the submitted queries 110. Hence, the identified portion 120 may include the subset of the submitted queries, based on the decrease (e.g., decrease 212) in query submissions. That is, the strength score module 511 may facilitate identification of the portion 120 as corresponding to the drop or lull in query submissions. According to certain example embodiments, the timing of one or more of the submitted queries 110 is one of multiple factors used by the strength score module 551 to determine the strength score of a particular query.

Figure 6:
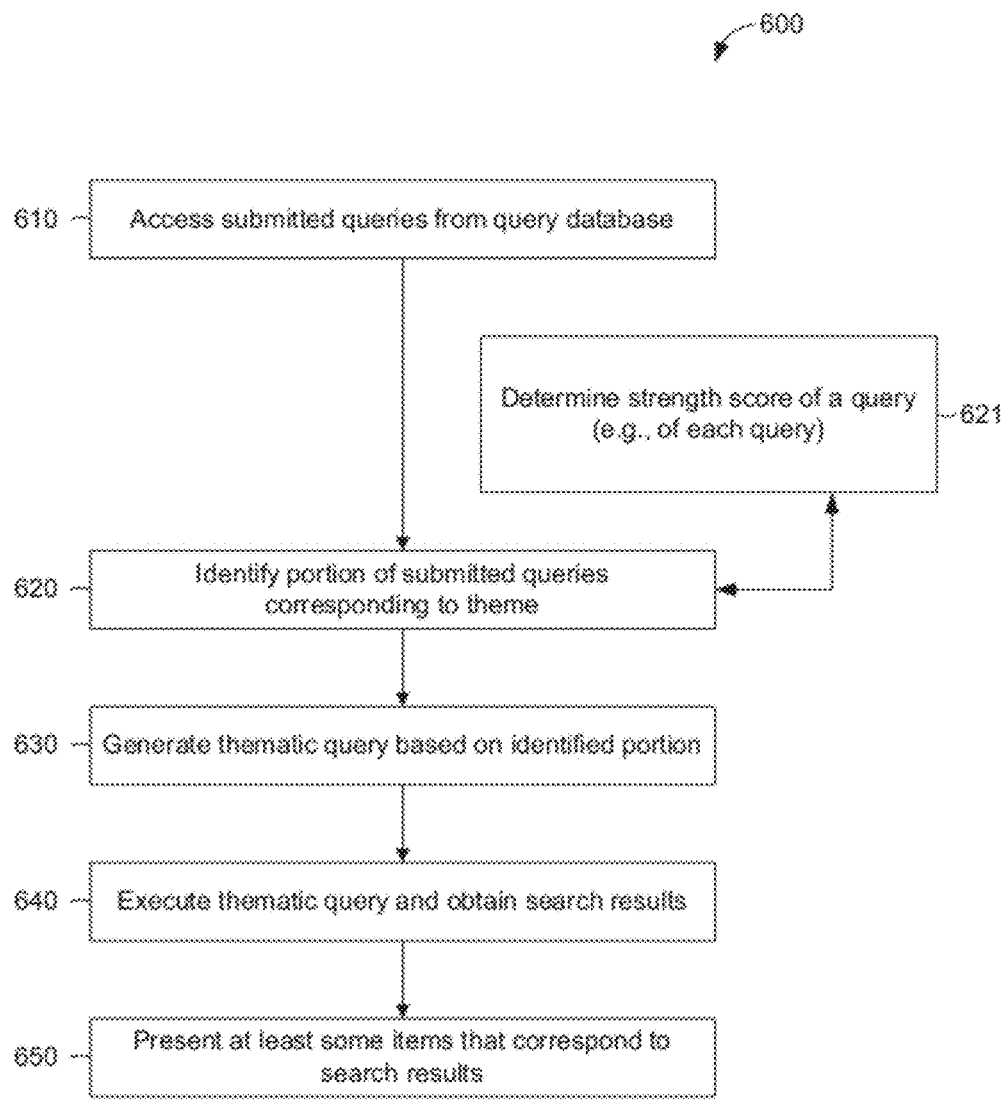
FIG. 6-7 are flowcharts illustrating operations in a method of presenting items based on a theme, according to some example embodiments.
Figure 7:
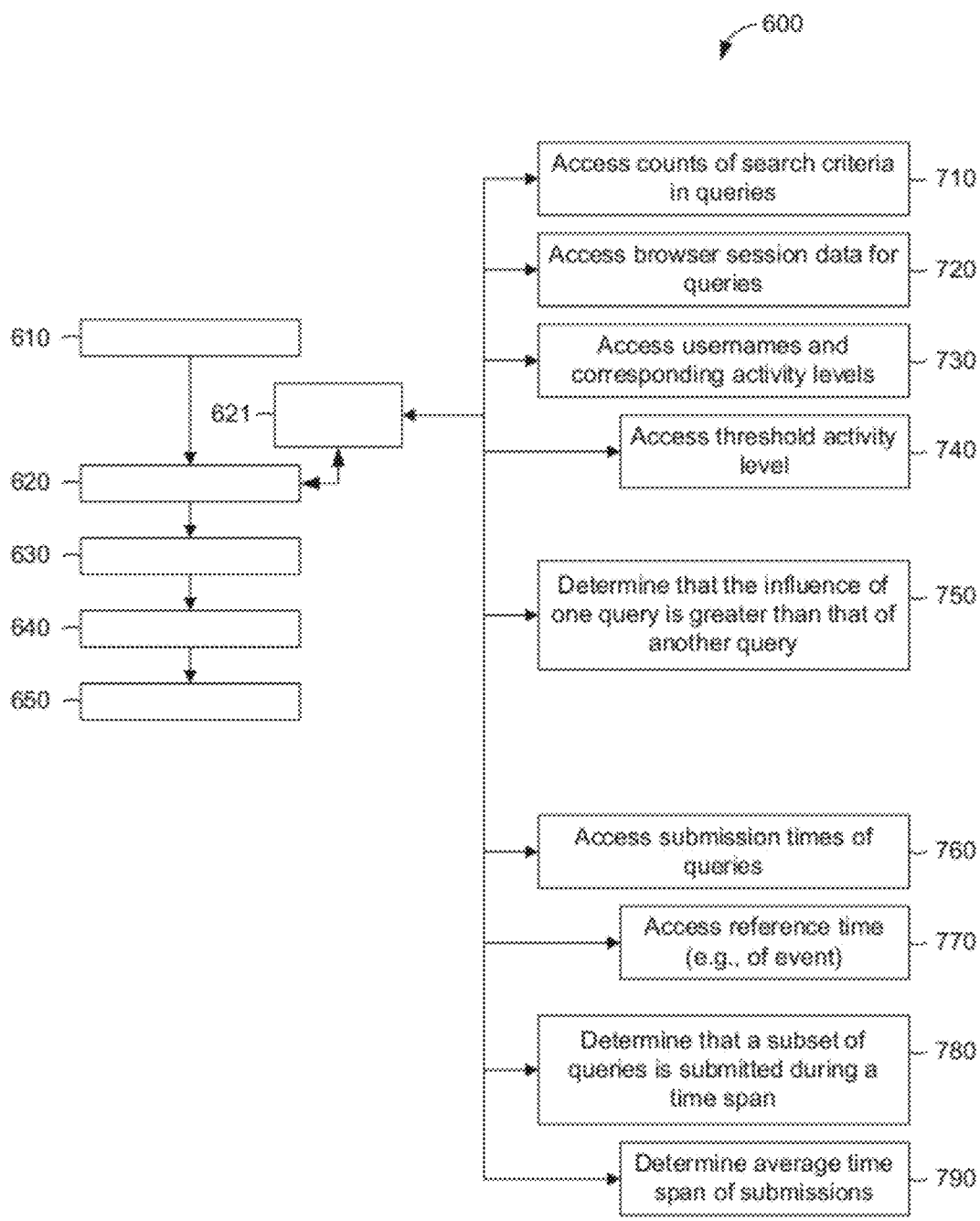

FIG. 6-7 are flowcharts illustrating operations in a method 600 of presenting items (e.g., item 151) based on a theme, according to some example embodiments. Operations in the method 600 may be performed by the query mining machine 310, using modules described above with respect to FIG. 4-5.

As shown in FIG. 6, the method 600 includes operations 610, 620, 621, 630, 640, and 650. Operation 621 may be performed as part of (e.g., a precursor task, a subroutine, or a portion) of operation 620.

In operation 610, the access module 410 of the query mining machine 310 accesses the submitted queries 110. For example, the access module 410 may access the submitted queries 110 from all or part of the query database 312. As noted above, the submitted queries 110 are aggregated from multiple users (e.g., of the network-based commerce system 305).

In operation 620, the identification module 420 of the query mining machine 310 identifies the portion 120 of the submitted queries 110 as corresponding to a theme. As shown in FIG. 6, operation 620 may include operation 621. According to operation 621, the strength score module 511 of the query mining machine 310 determines a strength score of a submitted query (e.g., query 111). As noted above, the strength score indicates a degree of influence that the submitted query has on the identifying of the portion 120 performed in operation 620. The strength score may be determined based on one or more factors described above with respect the strength score module 511 shown in FIG. 5.

In operation 630, the query generation module 430 of the query mining machine 310 generates the thematic query 130 based on the portion 120 of the submitted queries 110. As noted above, the portion 120 was identified in operation 620.

In operation 640, the search module 440 of the query mining machine 310 obtains the search results 140 by executing the thematic query 130. For example, the search module 440 may execute the thematic query 130 to search all or part of the item database 315. As noted above, the search results 140 reference the group 150 of items, and each of the group 150 of items (e.g., item 151) corresponds to the theme.

In operation 650, the presentation module 450 of the query mining machine 310 presents at least some of the group 150 of items. For example, the presentation module 450 may present the collection 153 of items (e.g., item 151) as corresponding to the theme (e.g., as a single collection that corresponds to the theme).

As shown in FIG. 7, the method 600 may include one or more of operations 710-790. According to various example embodiments, one or more of operations 710-790 are performed as part of (e.g., a precursor task, a subroutine, or a portion) of operation 621.

In operation 710, the strength score module 511 of the query mining machine 310 accesses counts of search criteria (e.g., search criteria 112 and 113) in the submitted queries 110 (e.g., by accessing the query database 312). This may have the effect of enabling the strength score module 511 to determine the strength score of a submitted query (e.g., query 111) based on a count of search criteria included in the submitted query.

In operation 720, the strength score module 511 of the query mining machine 310 accesses browser session data (e.g., a session identifier) corresponding to the submitted queries 110 (e.g., by accessing the query database 312). This may have the effect of enabling the strength score module 511 to determine the strength score of a submitted query (e.g., query 111) based on the submitted query and the different query being submitted in a single browser session.

In operation 730, the strength score module 511 of the query mining machine 310 accesses usernames and corresponding activity levels for the submitted queries 110 (e.g., by accessing the query database 312). As noted above, an activity level may correspond to a username that in turn corresponds to a user who submitted a query (e.g., query 111). Accordingly, operation 730 may have the effect of enabling the strength score module 511 to determine a strength score of a submitted query based on the activity level of the user who submitted that query. The activity level may represent a number of transactions conducted using the network-based commerce system 305, a number of queries submitted to the network-based commerce system 305, an age of the username, a reputation score of the username, or any suitable combination thereof, as discussed above with respect to FIG. 5.

In operation 740, the strength score module 511 of the query mining machine 310 accesses a threshold activity level (e.g., stored in the query database 312 or in the query mining machine 310). Operation 740 may be performed to complement operation 730 by providing the threshold activity level for comparison to the activity level of the user who submitted the query. As noted above, the threshold activity level may represent a minimum level of activity with respect to the network-based commerce system 305. In certain example embodiments, the threshold activity level may represent a maximum level of activity with respect to the network-based commerce system 305. This may have the effect of enabling the strength score module 511 to distinguish queries (e.g., query 111) that were submitted by a certain class of users (e.g., experienced users) from queries (e.g., query 114) that were submitted by a different class of users (e.g., inexperienced users).

In operation 750, the strength score module 511 of the query mining machine 310 determines that the influence of a submitted query (e.g., query 111) is greater than that of another submitted query (e.g., query 114). This determination may be based on information resulting from any combination of operations 710-740, discussed above.

In operation 760, the strength score module 511 of the query mining machine 310 accesses submission times of the submitted queries 110 (e.g., by accessing the query database 312). This may have the effect of enabling the strength score module 511 to determine that two queries (e.g., queries 215 and 217) are submitted within a time span (e.g., time span 250).

In operation 770, the strength score module 511 of the query mining machine 310 accesses the reference time 220. As noted above, the reference time 220 may mark an event (e.g., a periodic event or a news event). This may have the effect of enabling the strength score module 511 to determine that a submitted query (e.g., query 111) is submitted within a time span that includes the reference time (e.g., time span 260 or time span 270).

In operation 780, the strength score module 511 of the query mining machine 310 determines that two queries (e.g., queries 215 and 217) are submitted within a time span (e.g., time span 250). In operation 790, the strength score module 511 determines an average time span of query submissions that include same or similar search criteria (e.g., search criteria 112, 113, and 115). Some example embodiments implement operations 790 with the strength score module 511 accessing the average time span (e.g., from the query database 312). This may have the effect of enabling the strength score module 511 to compare the time span between the two queries with the average time span and accordingly detect an increase (e.g., increase 211) or a decrease (e.g., decreased 212) in the rate of query submissions with those same or similar search criteria.

According to various example embodiments, one or more of the methodologies described herein may facilitate communication of information about an item available for purchase from a seller. In particular, one or more the methodologies described herein may constitute all or part of a business method (e.g., a business method implemented using a machine) that presents one or more users with a collection of items that are all consistent with a theme. Moreover, presentation of the collection may be well-timed with respect to surges in interest in the theme, where these surges in interest may be correlated with one or more events or with no event.

When these effects are considered in aggregate, one or more of the methodologies described herein may obviate a need for certain efforts or resources that otherwise would be involved in matching users (e.g., as potential purchasers) with products or specimens thereof that are likely to be of interest. Efforts expended by a user in identifying a product for purchase may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Figure 8:
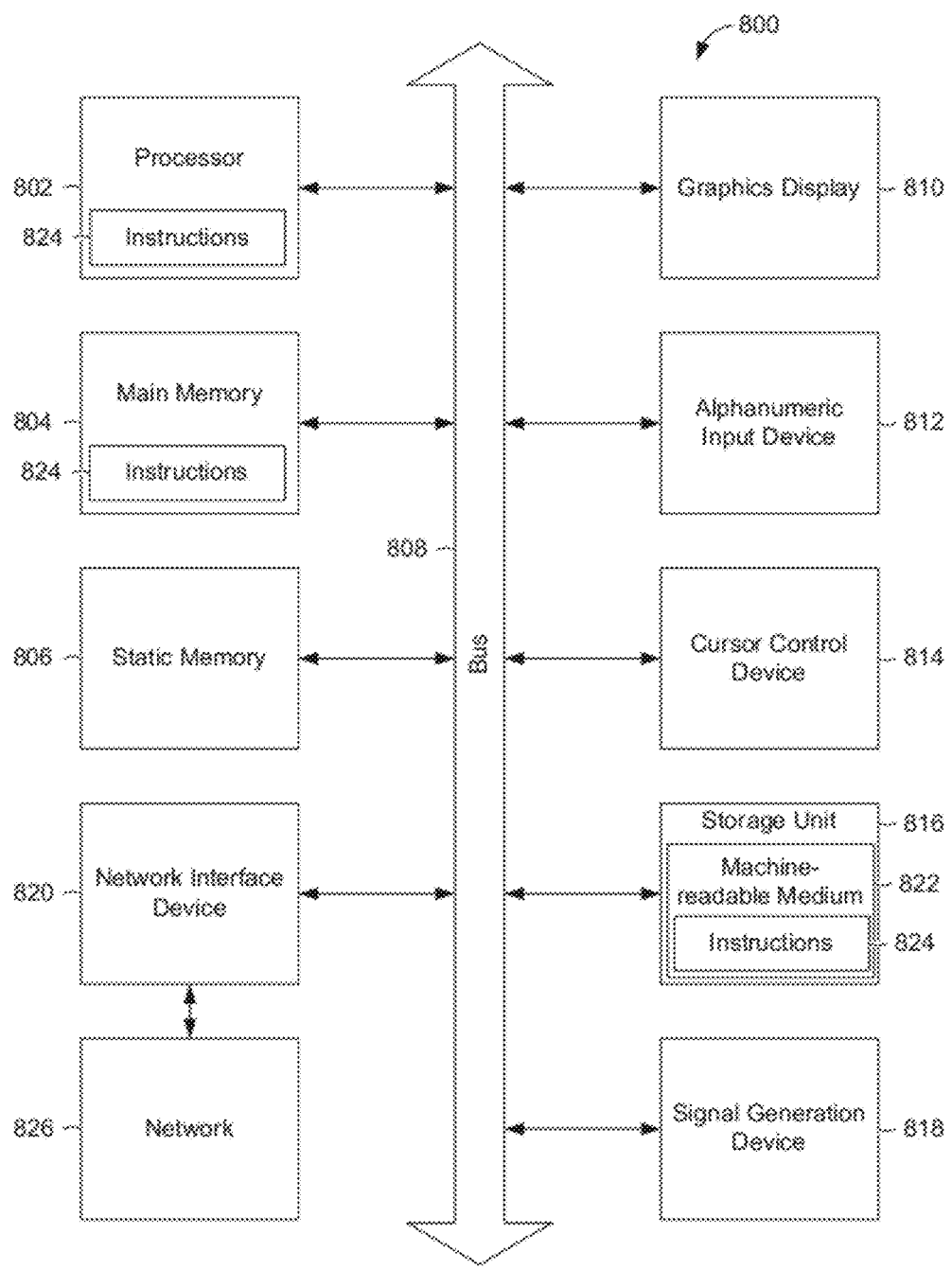
FIG. 8 is a block diagram illustrating components of a machine, according to some example embodiments, able to read instructions from a machine-readable medium and perform any one or more of the methodologies discussed herein.

FIG. 8 illustrates components of a machine 800, according to some example embodiments, that is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof the machine 800. Accordingly, the main memory 804 and the processor 802 may be considered as machine-readable media. The instructions 824 may be transmitted or received over a network 826 (e.g., network 390) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., software) for execution by the machine, such that the instructions, when executed by one or more processors of the machine (e.g., processor 802), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Figure 9:
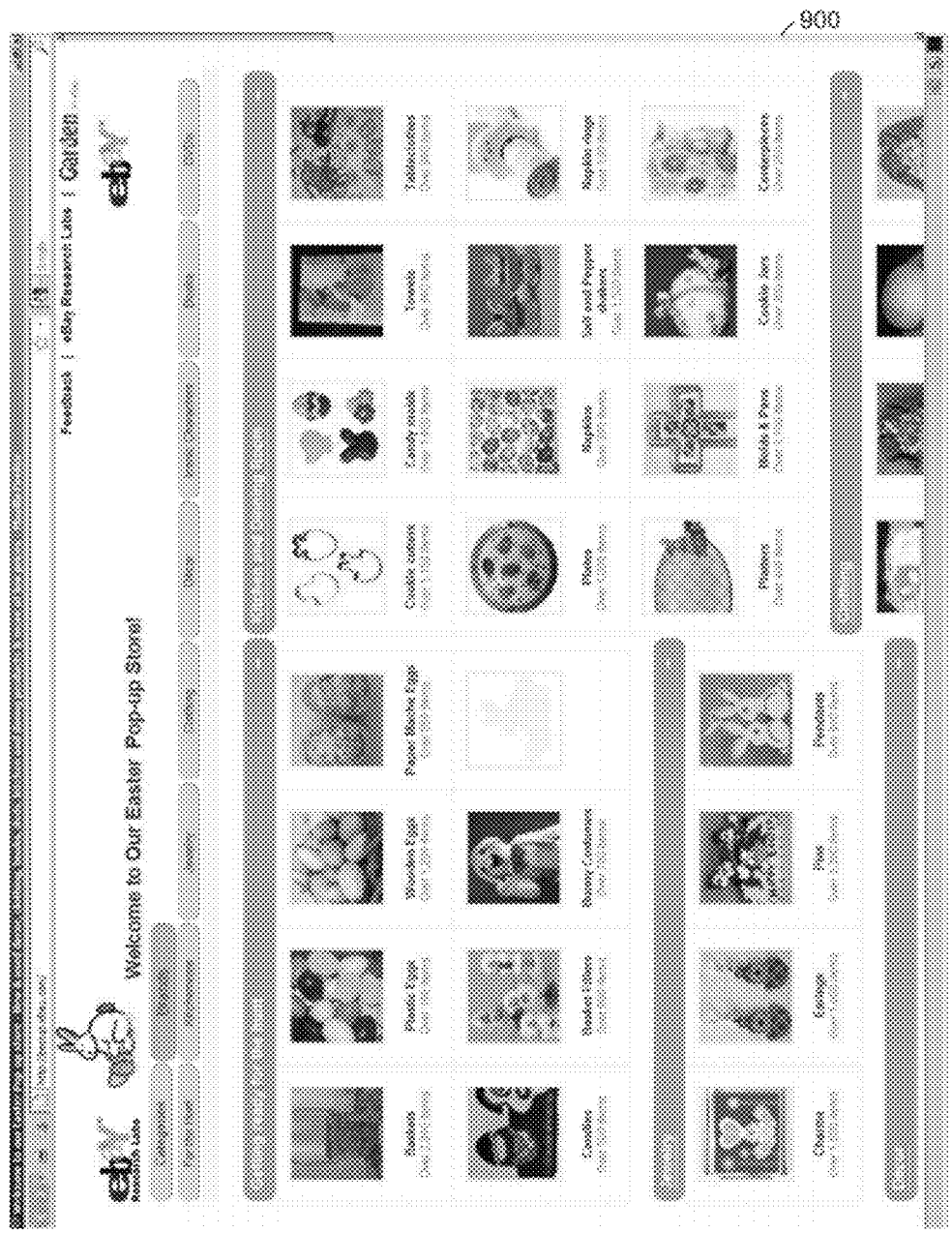
FIG. 9 is a screenshot illustrating a temporary electronic storefront for presenting items based on a theme, according to some example embodiments.

FIG. 9 is a screenshot that illustrates an electronic storefront 900 for presenting one or more items based on a theme (e.g., "Easter"), according some example embodiments. The electronic storefront 900 may be generated by the presentation module 450 of the query mining machine 310 (e.g., as part of execution of the operation 650 in the method 600). The items presented may include one or more of the group 150 of items (e.g., item 151). In particular, the electronic storefront 900 may present the collection 153 of items to a user (e.g., of the query mining machine 310, the network-based commerce system 305, or both) as being pertinent to the theme, where the theme may be a currently trending topic mined from the submitted queries 110. In some example embodiments, the electronic storefront 900 is a temporary electronic storefront (e.g., generated specifically in response to the operation 620 in the method 600). As shown in FIG. 9, the electronic storefront 900 may be marked as being dedicated to the theme (e.g., "Easter") and decorated in accordance with the theme (e.g., with one or more symbols of the theme). Accordingly, in various example embodiments, a temporary electronic storefront may be generated for each of several themes over time, as the individual themes are identified from the operation 620 in the method 600. This may have the effect of allowing the query mining machine 310, network-based commerce system 305, or both, to create, utilize, and dismantle multiple temporary electronic storefronts for multiple trending topics of interest to various users (e.g., users 332 and 352) as the multiple trending topics arise and fall among the various users.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing a plurality of submitted queries aggregated from a plurality of users;
identifying one or more of the plurality of submitted queries as corresponding to a theme by
determining a strength score of each of one or more of the plurality of submitted queries,
the strength score indicating a pertinence of a corresponding submitted query to the theme, the identifying being performed by a processor;
generating a thematic query based on the one or more identified
submitted queries and one or more of the determined strength scores;
obtaining search results by executing the thematic query, the search results referencing a plurality of items that each correspond to the theme; and
presenting at least some of the plurality of items in a single collection that corresponds to the theme.

2. The method of claim 1, wherein:
the submitted query includes multiple search criteria; and
the determining of the strength score is based on a count of the multiple search criteria.

3. The method of claim 2, wherein:
a further query among the plurality of submitted queries includes only one search criterion; and
the determining of the strength score includes determining that a pertinence of the submitted query to the theme is greater than a further pertinence of the further query to the theme.

4. The method of claim 1, wherein:
the submitted query and a different query among the plurality of submitted queries are submitted in a single browser session that corresponds to a session identifier;
the determining of the strength score is based on the submitted query and the different query being submitted in the single browser session.

5. The method of claim 4, wherein:
a further query among the plurality of submitted queries is submitted in a different browser session; and
the determining of the strength score includes determining that the pertinence of the submitted query to the theme is greater than a further pertinence of the further query to the theme.

6. The method of claim 1, wherein:
the submitted query is submitted by a particular user having a particular username that corresponds to a particular activity level with respect to a network-based system; and
the determining of the strength score is based on the particular username corresponding to the particular activity level.

7. The method of claim 6, wherein:
a further query among the plurality of submitted queries is submitted by a further user among the plurality of users, the further user having a further username that corresponds to a different activity level; and
the determining of the strength score includes determining that a pertinence of the submitted query to the theme is greater than a further pertinence of the further query to the theme.

8. The method of claim 6, wherein:
the particular activity level transgresses a threshold activity level that indicates a minimum level of activity with respect to the network-based system; and
the particular activity level is representative of at least one of a number of transactions conducted using the network-based system, a number of queries submitted to the network-based system, an age of the username, or a reputation score of the username.

9. The method of claim 1, wherein:
the submitted query is included in the identified one or more submitted queries and submitted within a time span that includes a reference time; and
the determining of the strength score is based on the submitted query being submitted within the time span.

10. The method of claim 9, wherein:
the reference time marks a periodic event; and
at least some of the time span is precedent to the reference time that marks the periodic event.

11. The method of claim 10, wherein:
the periodic event is at least one of an annual event, a monthly event, a calendar event, an astronomical event, a religious event, a government event, a holiday, or a season.

12. The method of claim 9, wherein:
the reference time marks a news event; and
at least some of the time span is subsequent to the reference time that marks the news event.

13. The method of claim 12, wherein:
the news event is at least one of a press release, a blog posting, a social network posting, or a publication of a news report.

14. The method of claim 1 further comprising:
the submitted query and a further query among the plurality of submitted queries are submitted within a time span; and the determining of the strength score includes determining that a subset of the plurality of submitted queries is submitted during the time span.

15. The method of claim 14, wherein:
the subset is included in the identified one or more submitted queries and indicative of an increase in submission of queries that correspond to the theme; and
the determining of the strength score includes determining that the time span is less than an average time span for submission of queries that correspond to the theme.

16. The method of claim 14, wherein:
the subset is included in the identified one or more submitted queries and indicative of a decrease in submission of queries that correspond to the theme; and
the determining of the strength score includes determining that the time span is greater than an average time span for submission of queries that correspond to the theme.

17. The method of claim 1, wherein:
the theme includes a descriptive token absent from the submitted query; and
the submitted query is included in the identified one or more submitted queries of the plurality of submitted queries.

18. The method of claim 17, wherein:
the descriptive token is absent from at least some of the identified one or more submitted queries of the plurality of submitted queries.

19. The method of claim 1, wherein:
the presenting of the at least some of the plurality of items is within a temporary electronic storefront marked as being dedicated to the theme.

20. A non-transitory machine-readable storage medium comprising instructions that, when executed by one or more processors of a machine, cause the machine to perform operations comprising:
accessing a plurality of submitted queries aggregated from a plurality of users;
identifying one or more of the plurality of submitted queries as corresponding to a theme by determining a strength score of each of one or more of the plurality of submitted queries,
the strength score indicating a pertinence of a corresponding submitted query to the theme, the identifying being performed by a processor;
generating a thematic query based on the one or more identified submitted queries and one or more of the determined strength scores;
obtaining search results by executing the thematic query,
the search results referencing a plurality of items that each correspond to the theme; and
presenting at least some of the plurality of items in a single collection that corresponds to the theme.

21. A system comprising:
an access module configured to access a plurality of submitted queries aggregated from a plurality of users;
a processor configured by an identification module to identify one or more of the plurality of submitted queries as corresponding to a theme, the identification module being further configured to
determine a strength score of each of one or more of the plurality of submitted queries,
the strength score indicating a pertinence of a corresponding submitted query to the theme;
means for generating a thematic query based on the one or more identified submitted queries and one or more of the determined strength scores;
a search module configured to obtain search results by executing the thematic query,
the search results referencing a plurality of items that each correspond to the theme; and
a presentation module configured to present at least some of the plurality of items in a single collection that corresponds to the theme.

* * * * *

UNITED STATES PATENT AND TRADEMARK OFFICE
CERTIFICATE OF CORRECTION

PATENT NO. : 8,880,513 B2
APPLICATION NO. : 13/094582
DATED : November 4, 2014
INVENTOR(S) : Sundaresan et al.

Page 1 of 1

It is certified that error appears in the above-identified patent and that said Letters Patent is hereby corrected as shown below:

Claims

In column 17, line 42, in Claim 1, after "by", delete "¶", therefor

In column 17, line 49, in Claim 1, after "identified", delete "¶", therefor

Signed and Sealed this
Twenty-fourth Day of November, 2015

Michelle K. Lee
*Director of the United States Patent and Trademark Office*